US012791327B2

(12) United States Patent
Mayer et al.

(10) Patent No.: US 12,791,327 B2
(45) Date of Patent: Nov. 10, 2026

(54) AUGMENTED TRAILER PARKING

(71) Applicant: Robert Bosch GmbH, Stuttgart (DE)

(72) Inventors: Philipp Mayer, Canton, MI (US); Greg Sypitkowski, Farmington Hills, MI (US); Daniel Nye, Farmington Hills, MI (US); Alain Sfeir, Sterling Heights, MI (US); Andreas Panakos, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 18/821,566

(22) Filed: Aug. 30, 2024

(65) Prior Publication Data

US 2026/0063427 A1 Mar. 5, 2026

(51) Int. Cl.

| | |
|---|---|
| ***G01C 21/34*** | (2006.01) |
| ***B60R 1/26*** | (2022.01) |
| ***B60W 30/06*** | (2006.01) |
| ***G01C 21/36*** | (2006.01) |
| ***G06V 20/20*** | (2022.01) |
| ***G06V 20/58*** | (2022.01) |

(52) U.S. Cl.

CPC ............ *G01C 21/3407* (2013.01); *B60R 1/26* (2022.01); *G01C 21/3647* (2013.01); *G01C 21/3664* (2013.01); *G06V 20/20* (2022.01); *G06V 20/586* (2022.01); *B60R 2300/305* (2013.01); *B60R 2300/806* (2013.01); *B60W 30/06* (2013.01); *B60W 2420/403* (2013.01); *B60W 2520/10* (2013.01)

(58) Field of Classification Search

None

See application file for complete search history.

(56) References Cited

U.S. PATENT DOCUMENTS

| | | | | |
|---|---|---|---|---|
| 11,184,531 | B2 | 11/2021 | Sypitkowski et al. | |
| 2015/0149036 | A1* | 5/2015 | You ....................... | B60W 30/12 701/1 |
| 2015/0235140 | A1* | 8/2015 | Rothermel ...... | B60W 30/18163 706/52 |
| 2016/0153778 | A1 | 6/2016 | Singh et al. | |
| 2018/0362026 | A1 | 12/2018 | Heimberger et al. | |
| 2019/0283776 | A1 | 9/2019 | Lübcke | |
| 2019/0383631 | A1* | 12/2019 | Bigio ..................... | G06V 20/59 |
| 2021/0107561 | A1 | 4/2021 | Gieseke et al. | |

(Continued)

FOREIGN PATENT DOCUMENTS

EP 3822142 A1 * 5/2021 ........... G06N 3/0464

*Primary Examiner* — Arslan Azhar

(74) *Attorney, Agent, or Firm* — Michael Best & Friedrich LLP

(57) ABSTRACT

A system of navigating and parking a vehicle with a trailer attachment. In one example, the system includes a camera, a sensor, and a display configured to display images. The system includes a controller including an electronic processor configured to receive the image data from the camera, receive the sensor data from the sensor, detect an object using the sensor data and image data, calculate a path of the vehicle relative to the object to generate a plurality of trajectories of the vehicle around the object, perform a perspective transformation of the image to generate an augmented image, the augmented image including the detected object and the path, receive a selection of one of the plurality of trajectories. The system may include controlling the vehicle in response to the selection of one of the plurality of trajectories.

19 Claims, 10 Drawing Sheets

(56) References Cited

U.S. PATENT DOCUMENTS

| | | | | |
|---|---|---|---|---|
| 2021/0197804 | A1* | 7/2021 | Wu | B60W 30/0956 |
| 2021/0214007 | A1 | 7/2021 | Loos et al. | |
| 2021/0339588 | A1* | 11/2021 | Takahama | B60D 1/36 |
| 2022/0144339 | A1 | 5/2022 | Lavoie et al. | |
| 2022/0214176 | A1* | 7/2022 | Kim | G08G 1/096725 |
| 2023/0166725 | A1* | 6/2023 | Tsimhoni | B62D 15/0285 |
| 2023/0410359 | A1* | 12/2023 | Mustafa | G06T 7/74 |
| 2024/0377965 | A1* | 11/2024 | Dong | G06F 3/0619 |
| 2024/0416914 | A1* | 12/2024 | Berner | B60W 50/14 |
| 2025/0018934 | A1* | 1/2025 | Niwa | G06V 20/56 |
| 2025/0058712 | A1* | 2/2025 | Meier | B60R 25/1001 |
| 2025/0095223 | A1 | 3/2025 | Singh et al. | |
| 2025/0227205 | A1* | 7/2025 | Wang | G06V 10/7715 |
| 2025/0349130 | A1* | 11/2025 | Sun | G06V 20/586 |

* cited by examiner

AUGMENTED TRAILER PARKING

FIELD

Embodiments, examples, aspects, and features described herein relate to a system of assisting vehicle parking.

SUMMARY

Many modern vehicles are equipped with a combination of radar systems and top-down, or bird's eye view, camera technology used to detect objects surrounding the vehicle and provide a comprehensive, high-angle visual representation to the driver. Some of these vehicles are also equipped with trailer hauling capabilities. However, existing radar and top-down camera systems may not adequately account for the presence of a trailer, which can limit or interfere with their performance. This issue is problematic during reverse driving operations, parking, or other vehicle maneuvers while a trailer is hitched to the vehicle, as the trailer may create blind spots or alter the perspective of the vehicle's top-down camera system. In some cases, these vehicle maneuvers are automated and implemented, at least partially, using navigation systems that rely on input from the vehicle's radar and top-down cameras.

Consequently, it is desirable for vehicle radar, top-down camera, and navigation systems to detect when a vehicle is towing a trailer, adjust the top-down camera views to compensate for the trailer's presence, and assist in vehicle and/or trailer maneuvers. To address this need, the embodiments described herein provide, among other things, systems and methods for integrating radar, top-down camera, and navigation technologies to aid in the navigation and parking of a vehicle with a trailer attachment. By leveraging the bird's eye perspective provided by top-down camera systems and augmenting it with radar data, these embodiments help to ensure that the driver has a fuller view of the vehicle and trailer's surroundings.

Some examples provide a system of object detection for a trailer connected to a vehicle. In some instances, the techniques described herein relate to a control system for a trailer connected to a vehicle. In one example, the system includes: a camera positioned on the vehicle. The camera is configured to capture images surrounding the vehicle. The system also includes a sensor configured to capture data about the surroundings the vehicle, a display configured to display images, and a controller The controller includes an electronic processor configured to receive the image data from the camera, receive the data from the sensor (sensor data), detect an object using the sensor data and image data, calculate a path of the vehicle relative to the object to generate a plurality of trajectories of the vehicle around the object, and perform a perspective transformation of the image to generate an augmented image. The augmented image includes the detected object and the path. The electronic processor is also configured to receive a selection of one of the plurality of trajectories, and in response to the selection of one of the plurality of trajectories, control the vehicle.

Other aspects, features, examples, and embodiments will become apparent by consideration of the detailed description and accompanying drawings.

DETAILED DESCRIPTION

Figure 1:
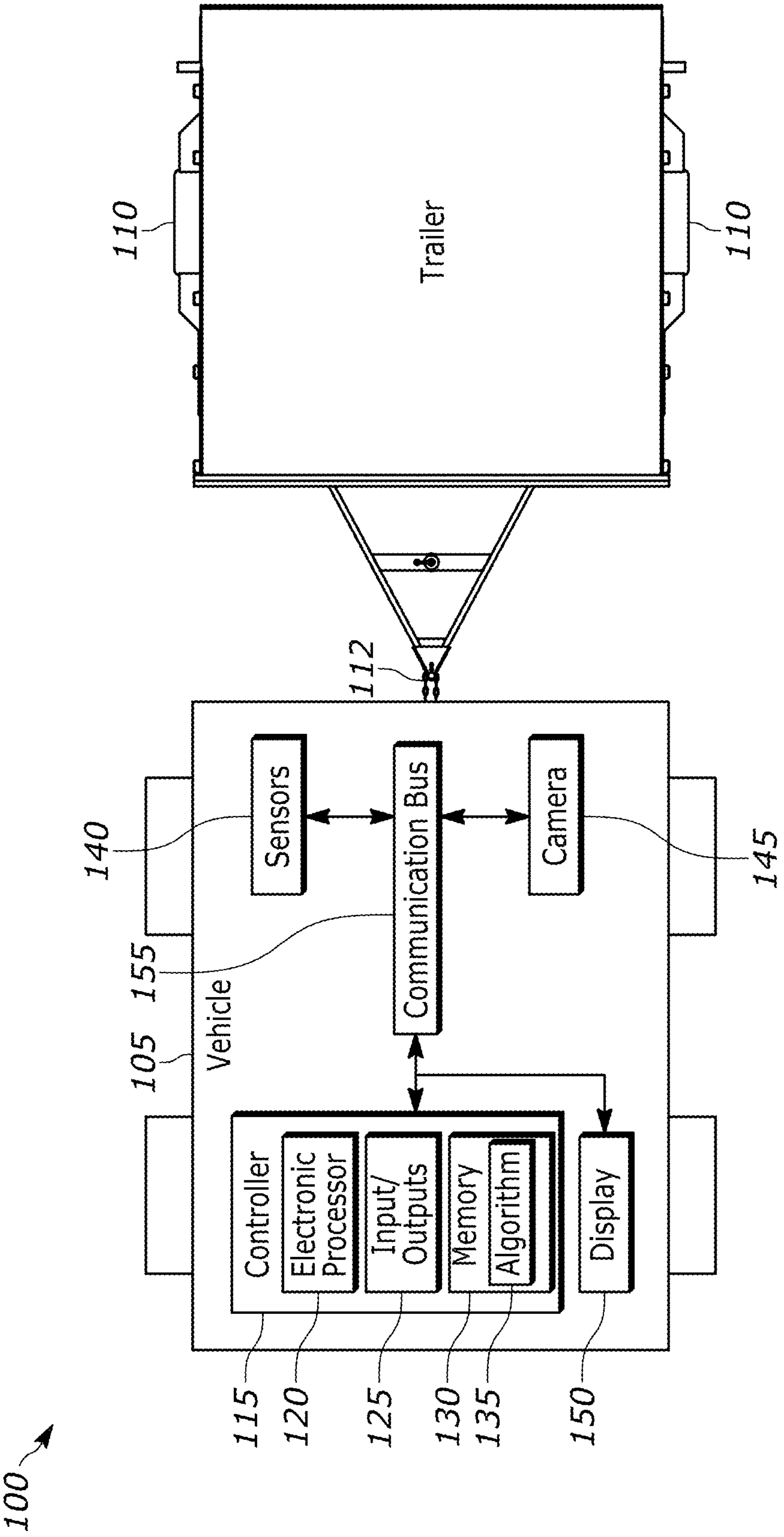
FIG. 1 is an illustration of a vehicle and trailer, according to some aspects.

Before specifics of embodiments, examples, aspects, and features are explained, a brief overview of vehicle imaging systems is provided. In general, a top-down (or bird's eye) camera imaging system in a vehicle is designed to provide a comprehensive, overhead view of the vehicle's surroundings, which is particularly useful for parking, maneuvering in tight spaces, and enhancing overall situational awareness. The system may employ one or more wide-angle cameras, for instance one mounted on each side of the vehicle (front, rear, left, and right), to capture images of the vehicle's surroundings from different perspectives. An onboard vehicle computer then processes these images using image processing algorithms to stitch them together, creating a 360-degree view of the vehicle's surroundings. The stitched image undergoes further processing to correct any distortions caused by the wide-angle lenses, to help ensure that the final image accurately represents the vehicle's surroundings.

The corrected image is then subjected to a perspective transformation, which converts the view from a ground-level perspective to a top-down perspective, making it appear as though the camera is positioned directly above the vehicle and providing a bird's eye view. The final top-down view image is displayed on a screen inside the vehicle, for instance on an infotainment system or a dedicated display of the vehicle, allowing a driver (also referred to as user) of the vehicle to better understand the vehicle's position relative to its surroundings and aiding in parking and maneuvering. Described below is a system that incorporates additional features, such as dynamic guidelines that help the driver navigate while parking, an object detection algorithm or application that can identify and highlight potential obstacles around the vehicle, and control features such as partial or fully automated vehicle navigation.

In addition to the basic features described above, the system can incorporate several advanced features to further enhance the driver's experience. For instance, dynamic guidelines that include a vehicle path may be overlaid on the top-down view, adapting to the vehicle's steering angle and assisting the driver in navigating while parking or maneuvering in tight spaces. This path may provide visual cues for the vehicle's projected trajectory, making it easier for the driver to align the vehicle with parking spots or avoid obstacles. Additionally in some instances, an object detection application is integrated into the system. The algorithm is configured to utilize techniques to identify and highlight potential obstacles around the vehicle. By drawing the driver's attention to these obstacles, the system can help prevent collisions and improve vehicle navigation. In some instances, the algorithm is trained to recognize various types of objects, such as pedestrians, other vehicles, curbs, and barriers in order to provide visual and/or auditory alerts to the driver when necessary.

In some instances, the top-down view system is combined with other sensors, such as radar, ultrasonic sensors, or lidar, to create a more comprehensive understanding of the vehicle's surroundings. By combining data from multiple sensors, the system can provide a more accurate and reliable representation of the environment even in challenging conditions such as low light or inclement weather. The system may also be configured to control features that enable partial or fully automated vehicle navigation. By integrating the top-down camera imaging system with the vehicle's steering, throttle, and braking controls, the vehicle can perform semi-autonomous or autonomous parking maneuvers. This can be useful in situations where parallel parking or tight parking spaces are involved, reducing stress and potential for human error associated with these tasks.

It should be noted that a plurality of hardware and software-based devices, as well as a plurality of different structural components may be utilized in various implementations of the systems. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software-based devices, as well as a plurality of different structural components may be utilized to implement the invention. For example, "control units" and "controllers" described in the specification can include one or more electronic processors, one or more memories including a non-transitory computer-readable medium, one or more input/output interfaces, and various connections (for example, a system bus) connecting the components.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable connections or links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

FIG. 1 depicts a vehicle and trailer system 100, which comprises a vehicle 105 coupled to a trailer 110 via a hitch 112. The vehicle 105 is equipped with a controller 115 that includes an electronic processor 120, an input/output interface 125, and memory 130. The electronic processor 120 can be realized as a microprocessor with separate memory 130, a microcontroller with integrated memory 130, or multiple processors. Additionally, the electronic processor 120 may be implemented wholly or partially as a field-programmable gate array (FPGA), an applications specific integrated circuit (ASIC), or similar, with the memory 130 being modified or eliminated, as necessary.

The memory 130, in certain embodiments, comprises non-transitory, computer-readable media that holds instructions executed by the electronic processor 120 to perform the method described herein. The memory 130 may include a program storage area and a data storage area, which can include various combinations of memory types, such as read-only memory and random-access memory. In the example depicted in FIG. 1, the memory 130 contains software utilized during the operation of the vehicle 105, including an environment and object detection algorithm 135 for assisting in vehicle and trailer maneuvers. The algorithm 135 is explained in further detail in FIG. 8, and below.

The input/output interface 125 may incorporate one or more input mechanisms and one or more output mechanisms, such as general-purpose inputs/outputs (GPIOs), analog inputs, digital inputs, and similar components. In some examples, the depicted components may be combined or separated into distinct software, firmware, and/or hardware. For instance, logic and processing may be distributed across multiple electronic processors and memories instead of being centralized within a single electronic processor. These hardware and software components may reside on the same computing device or be distributed among different computing devices connected by one or more networks or other appropriate communication links.

The vehicle 105 also features one or more sensors 140, which may include a radar sensor, a LIDAR sensor, or similar devices. In some embodiments, an individual sensor 140 possesses internal processing hardware and software, enabling it to generate data about objects detected by or via the sensors 140. Such data is sometimes referred to as sensor data. When an object is within the sensing range of the sensors 140, the sensor may produce proximity data regarding the object, as well as other data corresponding to the size, dimensions, speed, or other distinguishing features of the object. The vehicle 105 also incorporates a camera 145 designed to capture images of the trailer 110 connected to the vehicle 105. In one embodiment, the camera is positioned on the rear of the vehicle, near the trailer hitch, and angled downward to capture a view of the area behind the vehicle. In certain instances, additional cameras are mounted to the vehicle or the trailer. For example, the vehicle 105 may include a forward, rear, left, and/or right facing cameras, or similar cameras may be integrated or attached to the trailer 110. In some instances, the size and dimensions of the trailer 110, also referred to as trailer parameters, may be pre-determined or pre-programmed into the memory 130 of the controller 115. In other instances, the size and dimensions of the trailer 110 is calculated by the controller 115 based upon data obtained from the camera 145 and/or sensors 140.

The vehicle 105 also includes a display 150 that presents images captured by or via the camera 145 and images augmented by the algorithm 135. A communication bus 155, such as a controller area network (CAN) bus, a FlexRay™ communications bus, an Ethernet network, or another suitable bus, electrically connects the camera 145, sensor 140, display 150, and controller 115 to each other. The display may be configured to present a direct camera image feed from the camera 145 or may be configured to display an augmented image, such as a top-down (or bird's eye) view of the vehicle 105 and/or the trailer 110. For instance, the display may present an image to the driver similar to those illustrated in FIGS. 3A-7.

Figure 2:
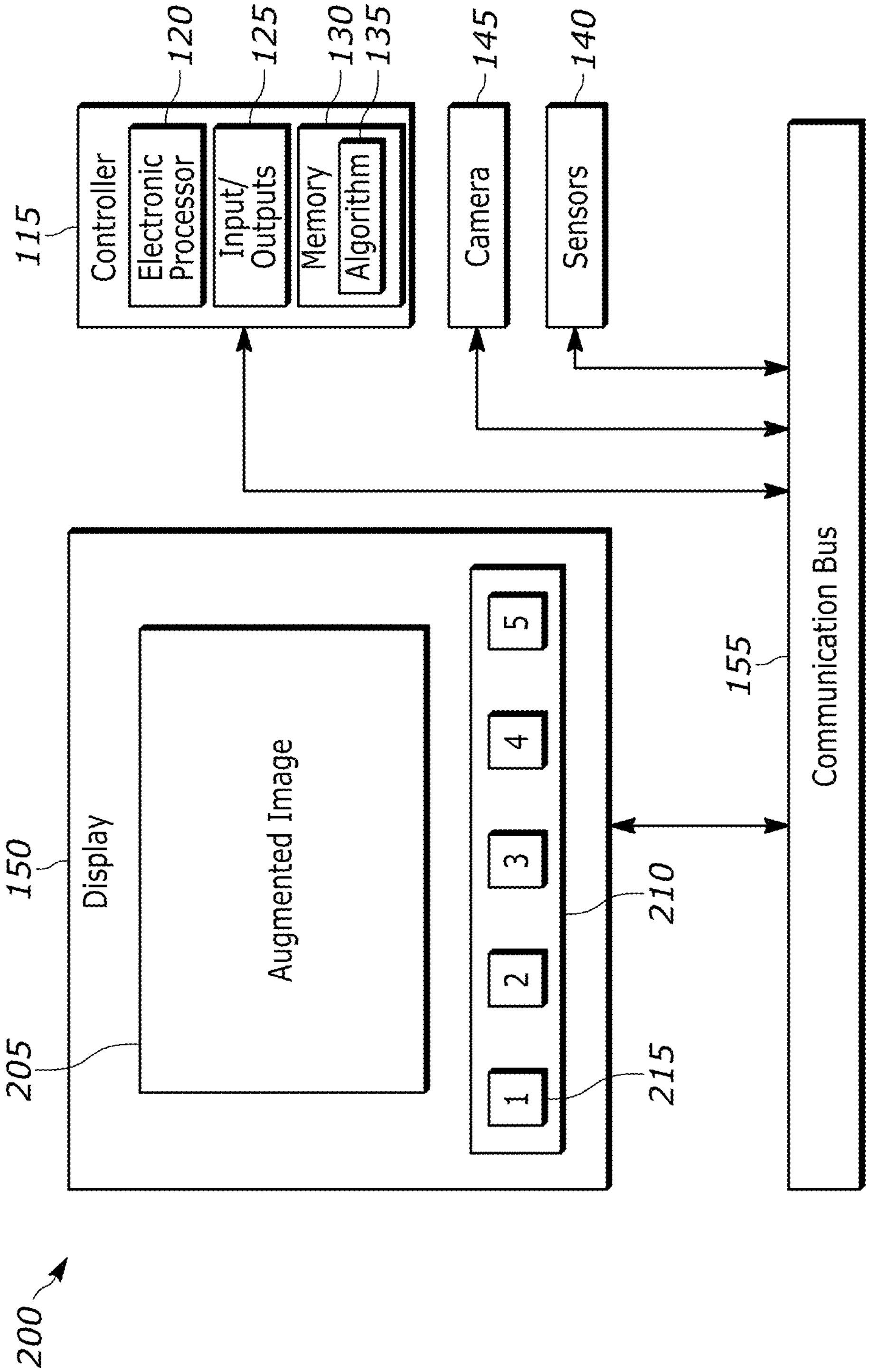
FIG. 2 is an illustration of a display for the system of FIG. 1, according to some aspects.

FIG. 2 is an illustration 200 of the display 150 according to some aspects and examples. The display 150 is configured to present an image 205 to the driver of the vehicle 105. The display may include a control interface 210 with one or more selectable elements 215, such as a button or touch interface, configured to allow a user to customize the display 150. For instance, a user may cycle through different views of the camera 145, cycle through multiple views of multiple cameras, or zoom, enhance, or otherwise modify the augmented image 205. In some examples, the selectable elements 215 may be used to select one of a plurality of vehicle trajectories. For instance, as detailed below in FIGS. 3A-7, the controller 115 may present the driver with an augmented image 205 that includes one or more vehicle trajectories. In some instances, a user cycles through one or more augmented images 205 and selects one of the possible vehicle trajectories for presentation on the display 150. In other instances, the controller selects a preferential vehicle trajectory. In some instances, the controller 115 dynamically updates the augmented image 205 as the vehicle 105 maneuvers. For instance, if a new object is detected by one or more of the sensors 140, the controller 115 may modify the augmented image 205 to include the new object. Likewise, the camera 145 may include the new object in the augmented image. Additionally, the controller 115 may control the vehicle 105 depending upon the selected vehicle trajectory.

Figure 3A:
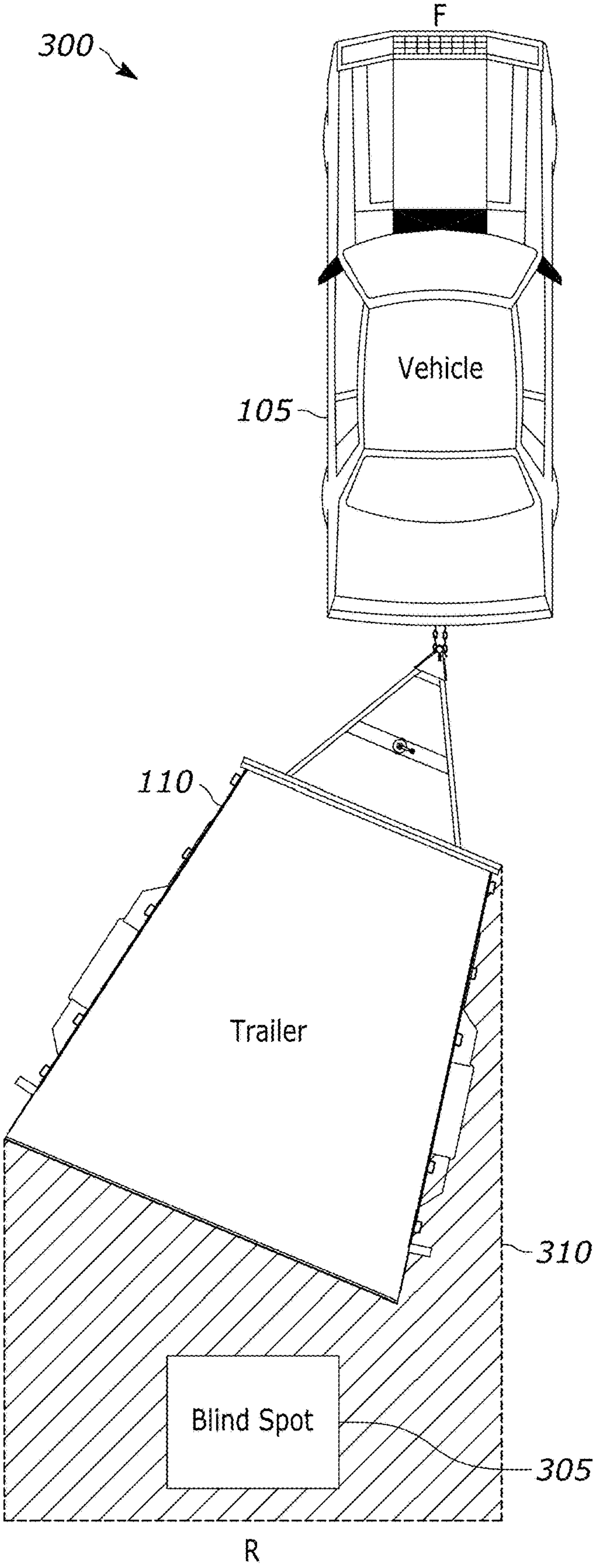
FIG. 3A is a top-down representation of picture of a trailer including a trailer blind spot, according to some aspects.

FIG. 3A is an illustration 300 depicting the trailer 110 attached to the vehicle 105. The illustration 300 highlights the presence of a blind spot 305, which, in this particular instance, is located within an area 310 that is not visible to the driver of the vehicle 105 due to the positioning of the trailer 110 behind the vehicle 105. In general, trailers often have multiple blind spots, which can arise from various factors such as the size of the trailer, the driver's position relative to the trailer, the angle of a turn made by the vehicle or the trailer, and similar considerations. In illustration 300, the blind spot 305 is shown within the area 310, but it is important to note that the area 310 serves to represent a potential blind spot that emerges when the vehicle 105 and trailer 110 are in a turning position.

Blind spots are dynamic entities that change as a vehicle moves (e.g., is driven), and a specific blind spot may be larger or smaller than the blind spot 305 as depicted, or may manifest in various locations, including areas to the rear R of the vehicle 105. As a vehicle navigates a terrain or executes a leftward or rightward turning maneuver, potential blind spots are generated. For example, when a vehicle makes a right turn, a blind spot 305 may appear at the rear left of the trailer. The size of the trailer can also influence the likelihood and location of blind spots occurring. A wide trailer, for instance, may obstruct a larger portion of the driver's field of vision compared to a narrow trailer. In addition, a trailer carrying a sizable load, such as a boat trailer, may introduce additional blind spots depending on the contents or load of the trailer. For example, a boat trailer may generate different blind spots depending on the size of the boat loaded onto the trailer, or depending on if the trailer is loaded with a boat at all.

Blind spots can also occur at the front F of the vehicle. For example, a blind spot may be present in front of a vehicle with a large, elevated cabin. Consequently, a top-down view of the vehicle 105 and trailer 110, generated based on data from the camera 145 and sensors 140, can provide significant benefits to the driver of the vehicle 105 in navigating any objects that may be located around the vehicle 105.

Figure 3B:
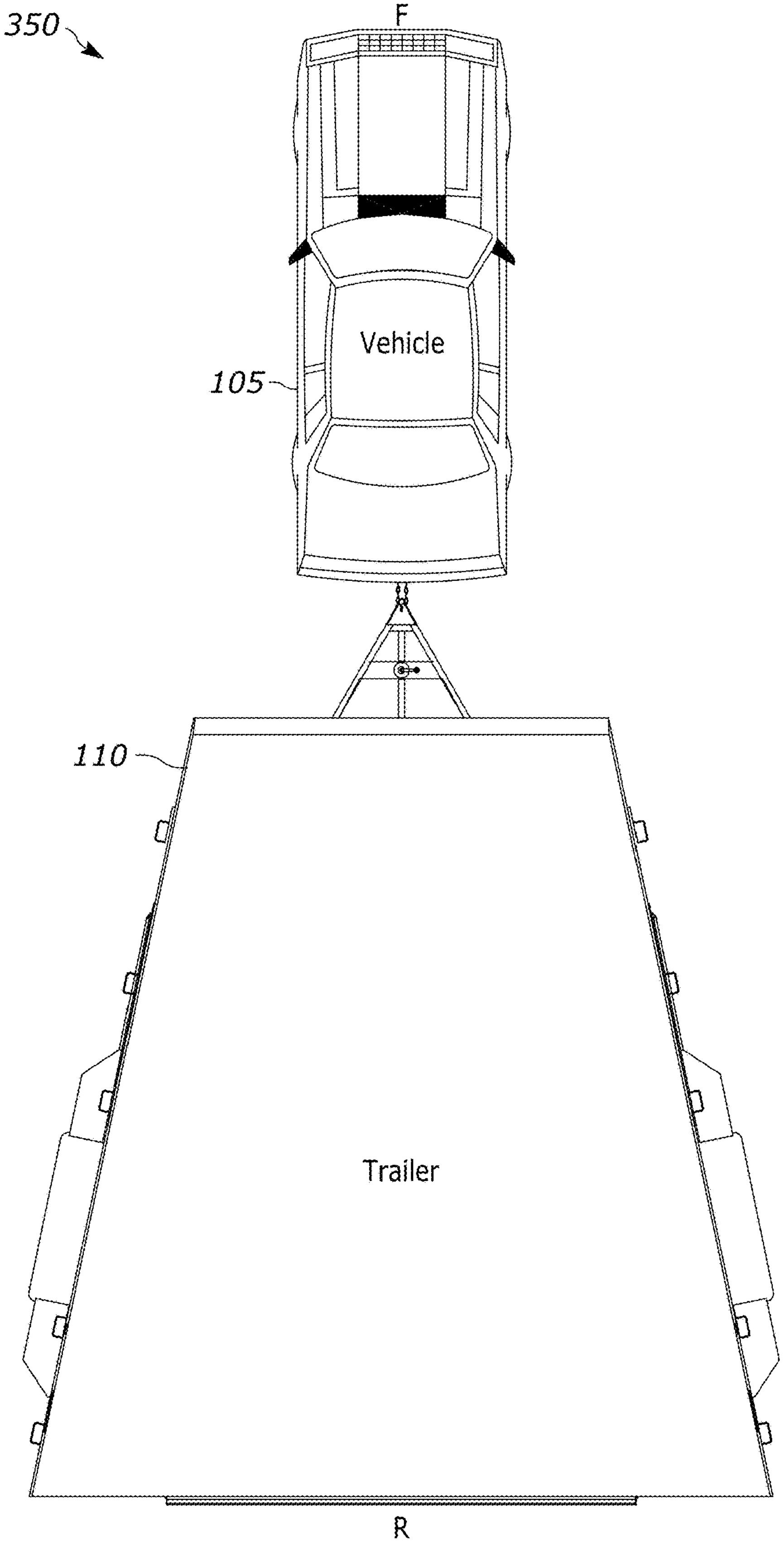
FIG. 3B is a top-down representation of picture of a trailer including a trailer blind spot, according to some aspects.

FIG. 3B is a top down is an illustration 350 depicting the trailer 110 attached to the vehicle 105, similar to FIG. 3A. However, in FIG. 3B, the illustration 350 is distorted to illustrate the Manhattan effect, also known as the Manhattan phenomenon or skyscraper effect. The Manhattan effect is an optical illusion that occurs when viewing objects through a camera lens, such as, for example, the camera 145. This effect causes vertical lines to appear to converge or lean inward towards the center of the image, creating a distorted perspective that resembles a pyramid or inverted triangle shape. This effect occurs because the camera lens attempts to capture a three-dimensional scene on a two-dimensional plane, leading to a visual compression of the vertical lines as they extend upwards in the frame. For example, as show in illustration 350, the rear R of the trailer 110 appears much wider than it is, which may exaggerate the blind spot. To minimize or correct the Manhattan effect, systems may employ various techniques, such as applying post-processing corrections to augment images, such as those described herein.

Figure 4:
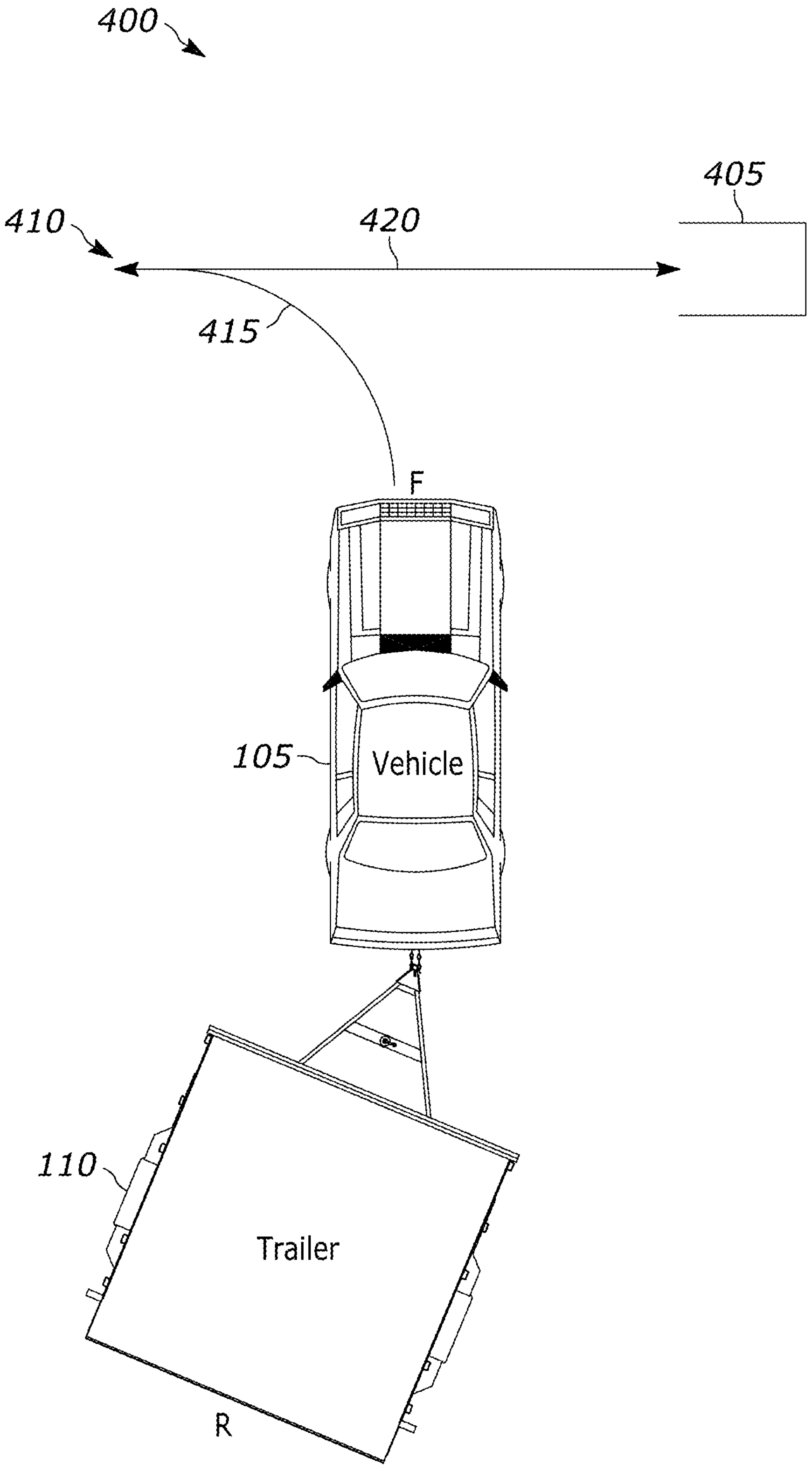
FIG. 4 is a top-down representation of picture of a trailer including a vehicle trajectory, according to some aspects.

FIG. 4 is a top-down illustration 400 of the vehicle 105 and the trailer 110 including a path 410. The illustration also includes a parking location 405 and a path 410 that includes a forward vehicle trajectory 415 and a reverse vehicle trajectory 420. The path 410 is calculated by the controller 115 based upon the orientation of the vehicle 105, the relative position of the vehicle 105 and the parking location 405, and other factors such as vehicle speed, vehicle turning radius, or available space within the surrounding environment as detected by the camera 145 or the sensors 140. As described earlier, the vehicle trajectories 415, 420 may be dynamically updated as the camera 145 and/or sensors 140 generate data.

The vehicles trajectories 415, 420 are calculated by the controller 115 using a combination of data from the sensors 140 and/or camera 145 installed on the vehicle 105. For example, the controller 115 may receive data from multiple sources, such as a GPS unit, an inertial measurement unit (IMU), a wheel speed sensor, a steering angle sensor, or the like. The GPS unit provides vehicle location information (for example, the vehicle's global geospatial position), while the IMU measures the vehicle 105 acceleration and orientation. Sensors 140 such as a wheel speed sensor or steering angle sensor provide the controller 115 with information about the vehicle's speed and direction. The data from the sensors 140 and camera 145 is then processed by the controller 115 using the algorithm 135 to estimate the vehicle's current state, including its GPS location, velocity, speed, and/or orientation. The sensors may also provide data indicating the relative position of the vehicle to the surrounding environment or any objects detected within the environment. This process may combine information from multiple sources and sensors to provide a more accurate estimate of the vehicle's state. Once the current state is estimated, the controller 115 uses this information to predict possible future trajectories, such as vehicle trajectories 415 and 420. Additionally, GPS maps may provide information about a road layout, traffic signs, speed limits, or similar road features that may be incorporated when generating the augmented image 205.

The vehicle trajectories 415, 420 include various factors such as the vehicle's current speed, acceleration, steering angle, and/or surrounding road/surface curvature. As detailed further in FIG. 8, the algorithm 135 may also interpret or extrapolate the predicted behavior of detected objects, such as other road users or any obstacles detected by the cameras and sensors. The controller 115 continuously updates the trajectories 415, 420 based upon new sensor and camera data, ensuring that the vehicle can respond to changes in its environment in real-time.

Additionally, the system can be enhanced with several optional features to improve its functionality and user experience. For example, the system may incorporate a dynamic trajectory adjustment, which monitors the vehicle 105 and trailer 110 position and orientation and adjusts the selected trajectory if deviations occur due to factors such as uneven terrain, objects, or driver error. This feature can aid the vehicle 105 and trailer 110 to stay on the selected trajectory and reach the desired parking location. Another feature is object avoidance, where the system integrates data from the vehicle's sensors 140 or camera 145 to detect obstacles in the path of the selected trajectory. When an obstacle is detected, the system can automatically recalculate the trajectory to avoid the obstacle while still reaching the desired parking location. The details of object detection are discussed at greater length below and in FIG. 8.

To accommodate different types and sizes of trailers, the system may be pre-programmed with multiple trailer configurations. This allows users to input their trailer's specifications, such as length, width, height, and hitch type, for more accurate trajectory calculations. For example, a boat trailer may have different dimensions (height, length, width) than a camper trailer, or may introduce different blind spots. Additionally, predictive parking assistance can be implemented using the algorithm 135 to analyze the driver's parking habits and preferences over time. Based on this data, the system can suggest the most likely parking location or trajectory based on the current situation, streamlining the parking process.

Additionally, or alternatively, the system can also include a parking location memory feature, which allows users to save frequently used parking locations, such as a home garage, a favorite campsite, boat launch, or the like. In one example, when the vehicle 105 and trailer 110 approach one of these saved locations, the system automatically suggests the appropriate trajectory, making the parking process even more convenient. In other instances, the system communicates with external infrastructure, such as parking garages equipped with sensors or communication devices that provide additional information to the vehicle's parking system. For example, a parking garage may have sensors that detect available spaces and communicate this information to the vehicle, allowing the system to guide the user directly to an open spot.

In some examples, a voice-activated control is incorporated into the system, allowing users to select a parking location or initiate the parking process using voice commands instead of through one of the selectable elements 215 on the display 150. This feature is useful in situations where the user's hands are occupied or when the display 150 is out of reach.

Figure 5:
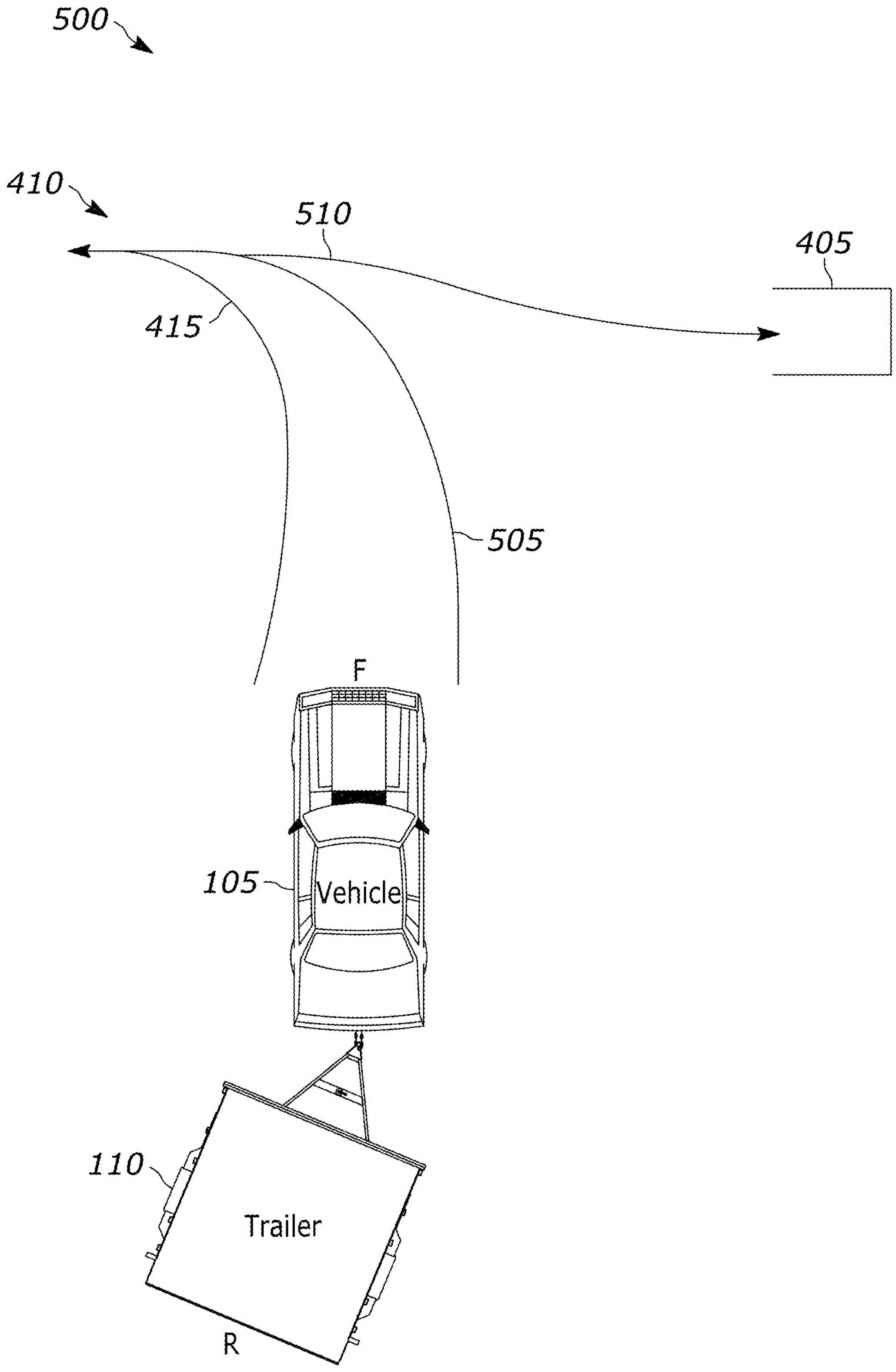
FIG. 5 is a top-down representation of picture of a trailer including a vehicle trajectory, according to some aspects.

FIG. 5 is a top-down illustration 500 of the vehicle 105 and the trailer 110 including the path 410. The illustration 500 includes similar elements as FIG. 4, such as the path 410. The path 410 additionally includes a forward trailer trajectory 505 and a reverse trailer trajectory 510. Similar to the vehicle trajectories 415, 420, the trailer trajectories 505, 510 are determined based upon data generated by the sensors 140 and camera 145, and the trailer trajectories 505, 510 are dynamically updated as the vehicle 105 moves and turns. In some instances, both vehicle trajectories 415, 420 and trailer trajectories 505, 510 are included in the augmented image 205 presented on the display 150. In some instances, only one of the vehicle trajectories 415, 420 or the trailer trajectories 505, 510 is included in the augmented image 205 presented on the display 150. In some examples, the user may select which of the vehicle trajectories 415, 420 or the trailer trajectories 505, 510 they wish to select or present on the display 150 using the selectable elements 215.

Figure 6:
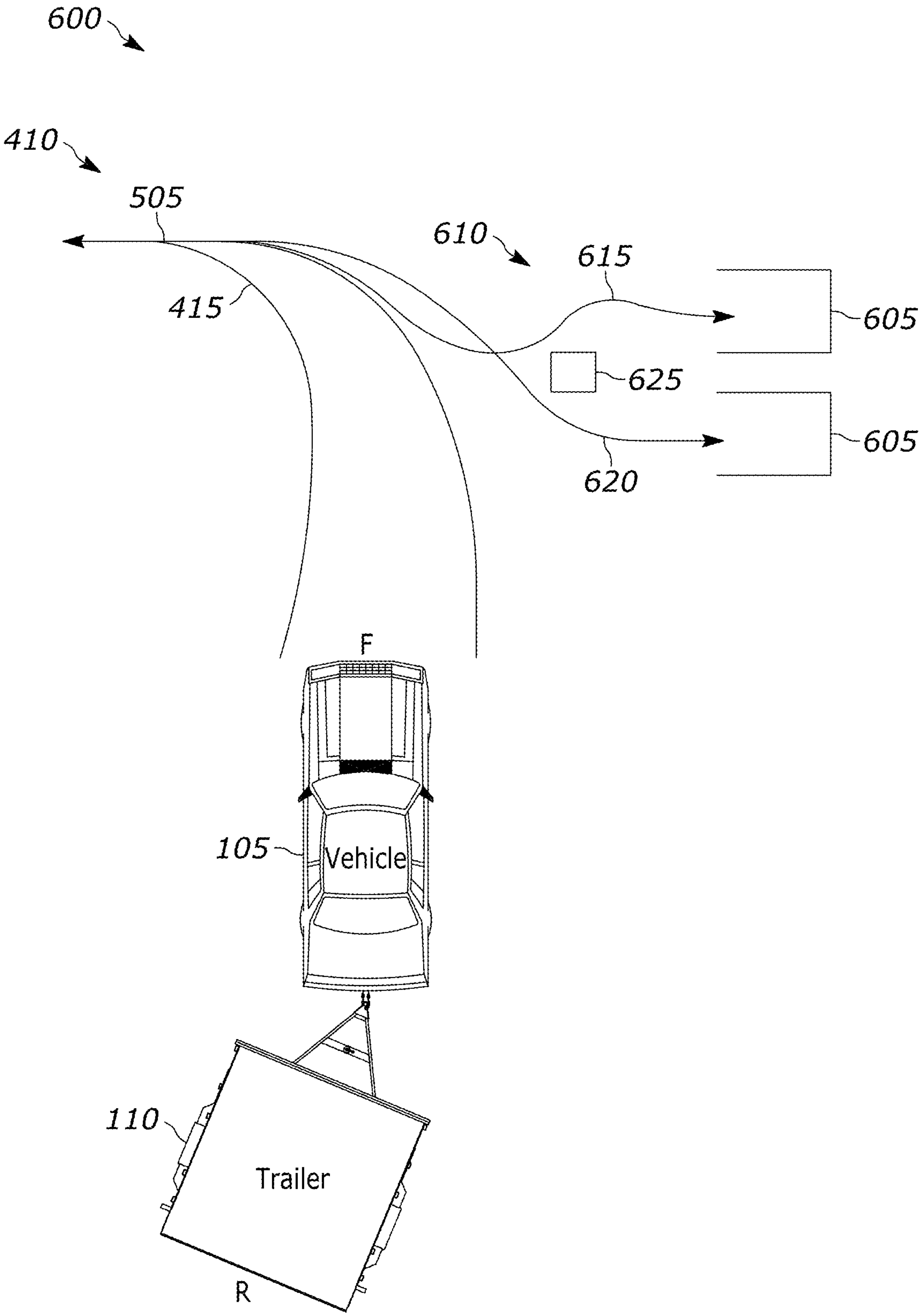
FIG. 6 is a top-down representation of picture of a trailer including a vehicle trajectory and an object, according to some aspects.

FIG. 6 is a top-down illustration 600 of the vehicle 105 and the trailer 110 including the path 410. The illustration 600 includes similar elements as FIGS. 4-5, such as the path 410. However, the illustration 600 further includes a plurality of parking locations 605 and a plurality of reverse trailer trajectories 610, including a first reverse trailer trajectory 615 and a second reverse trailer trajectory 620. The controller 115 is configured to calculate the first reverse trailer trajectory 615 and the second reverse trailer trajectory 620 to avoid a detected object 625 For example, if the controller 115 receives data from the sensors 140 or the camera 145 indicating the presence of the object 625, the controller 115 calculates which possible trajectories avoid the object 625.

The plurality of reverse trailer trajectories 610 are configured for presentation on the display 150 similar to previously described trajectories and elements of the path 410. A user selects one of the plurality of reverse trailer trajectories 610 for presentation on the display 150 or may choose to show all the plurality of reverse trailer trajectories 610 simultaneously. In instances where the controller 115 controls the vehicle 105, only one of the plurality of reverse trailer trajectories 610 is selected (though, optionally, more than one of the plurality of reverse trailer trajectories 610 may be presented on the display 150).

Figure 7:
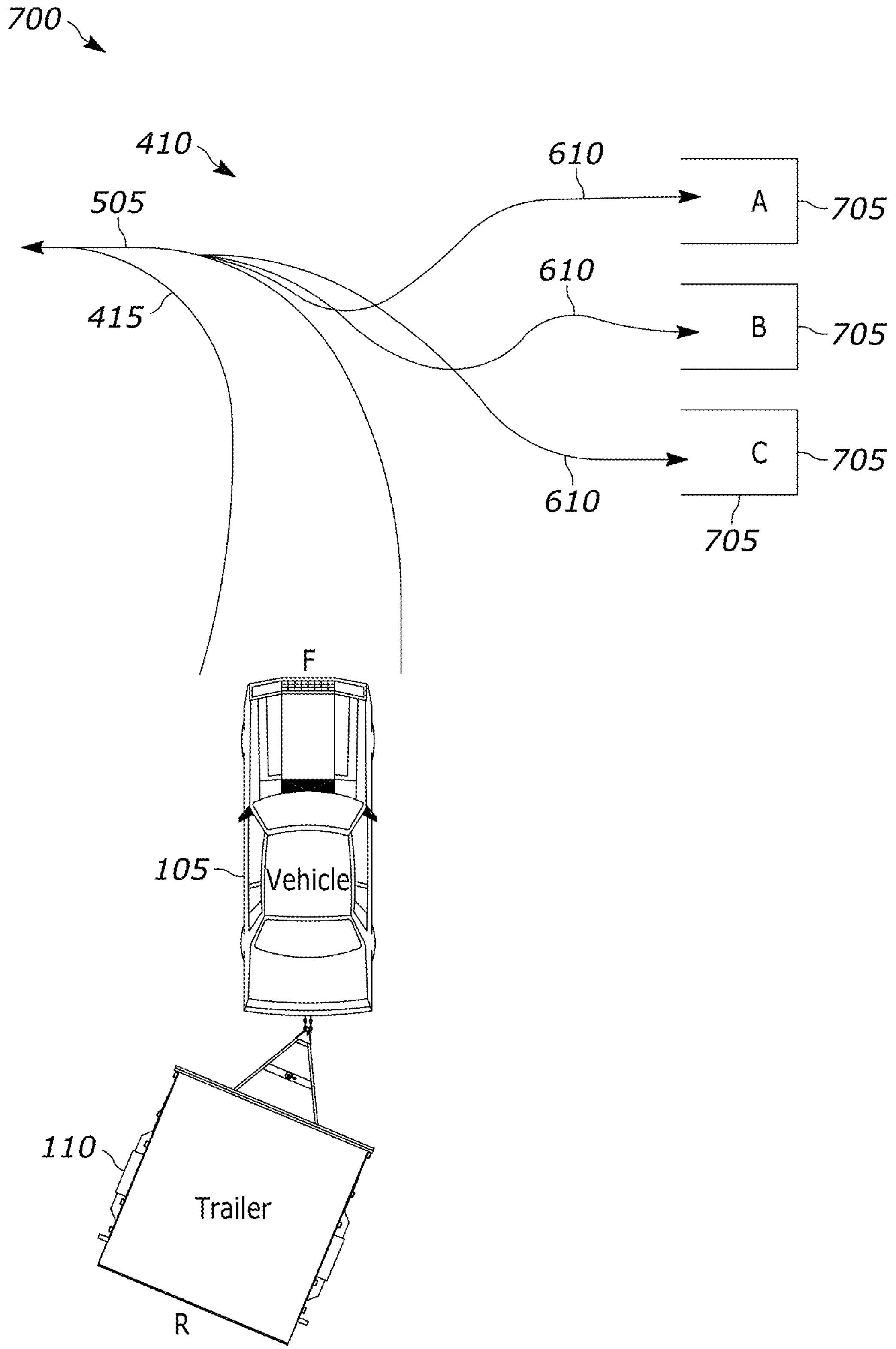
FIG. 7 is a top-down representation of picture of a trailer including a vehicle trajectory, according to some aspects.

FIG. 7 is a top-down illustration 700 of the vehicle 105 and the trailer 110 including the path 410. Similar to previously described, the path 410 may include plurality of reverse trailer trajectories 610. Additionally illustrated in FIG. 7 are a plurality of parking locations 705, including location A, location B, and location C. A user may select one of the plurality of parking locations 705 using the selectable elements 215 on the display 150 to inform the controller 115 of the desired location. The controller 115 then determines the trajectory out of the plurality of reverse trailer trajectories 610 based upon the selection. For example, if a user selects parking location C, the controller 115 incorporates the selection of location C into the augmented image 205, and display the corresponding one of the plurality of reverse trailer trajectories 610 to navigate the vehicle 105 or trailer 110 into the parking location C.

Figure 8:
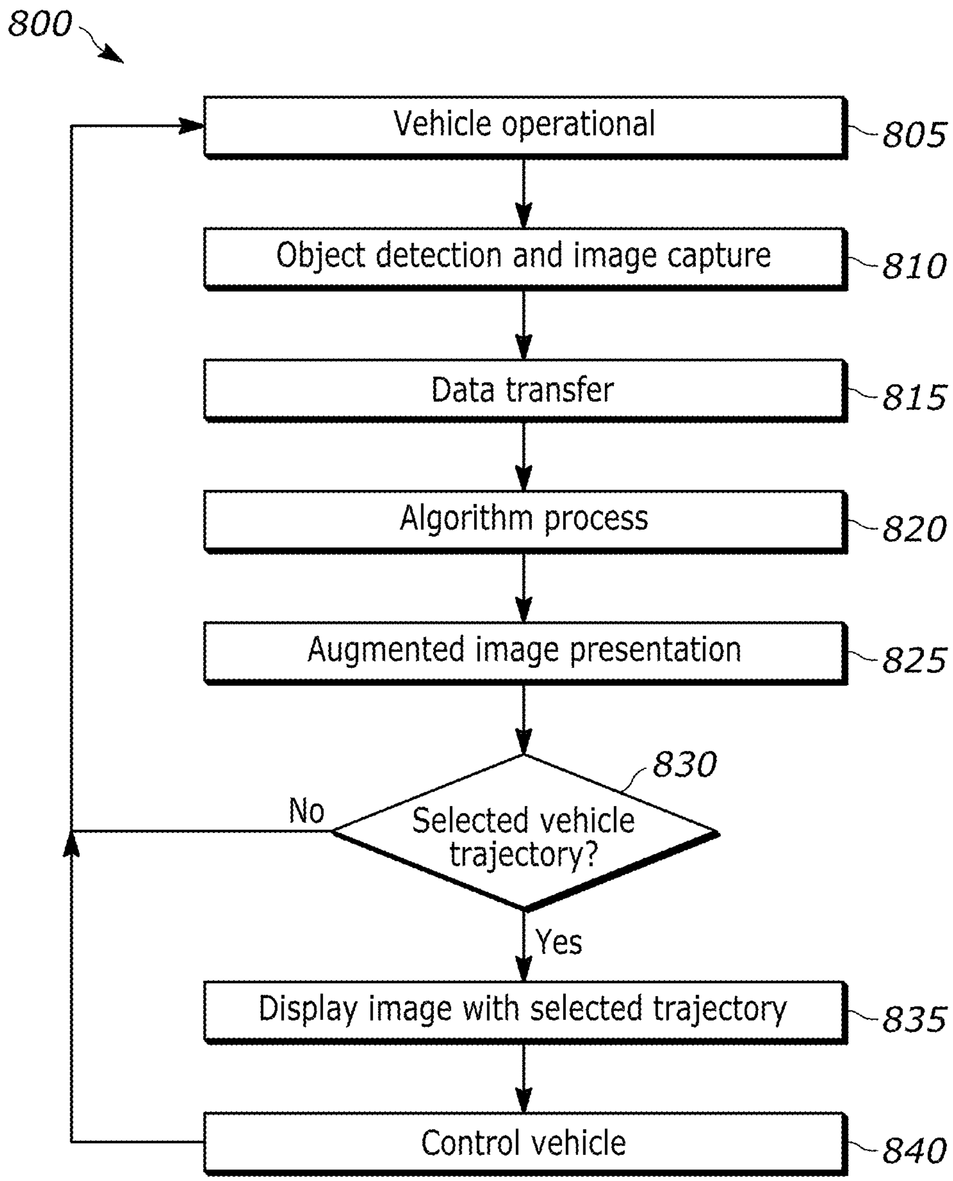
FIG. 8 is a flowchart of a process for generating augmented images, according to some aspects.

FIG. 8 is a flowchart of a process for operating a vehicle and detecting objects in the environment around the vehicle, according to some aspects. The process 800 begins at step 805, with the vehicle 105 towing the trailer 110. The process continues to step 810, where the sensors 140 captures data and the camera 145 records an image of the area surrounding the vehicle 105 and the trailer 110. In some instances, data captured by the sensors includes radar spectral data, location data, vehicle acceleration data, steering wheel angle, vehicle speed, or the like. In some examples, at step 805, other cameras capture different images from alternative perspectives, such as images captured from cameras on the trailer or alternative locations around the vehicle. At step 815 of the process 800, the camera 145 sends the image to the controller 115 and the sensors 140 sends the data to the controller 115.

At step 820, the electronic processor 120 of the controller 115 executes the algorithm 135, which processes every image captured by the camera 145 and all the data captured by sensors 140. The algorithm 135 correlates the data with the image and analyzes any object 625 that may be detected by the sensors 140 or captured by the camera 145. The controller 115 then generates the augmented image 205 and performs a perspective transformation, which includes superimposing a representation of the object 625 onto the augmented image 205, creating an augmented image 205 for presentation on the display 150. The representation of the object 625 may be located within a blind spot of the driver of the vehicle 105, and therefore the augmented image 205 provides an enhanced field of view of the surroundings of the vehicle 105 and trailer 110.

The augmented image is then presented on the display 150, at step 825. In some instances, proximity information is also included in the augmented image. For example, the sensors 140 detect the proximity of an object 625 and include this information within the data sent to the controller 115, which then calculates the distance between the object 625 and the vehicle 105 or the trailer 110. The proximity information, which may include the speed or size of the object 625 and its distance from the vehicle 105 or trailer 110, is displayed on the display 150 alongside or incorporated into the augmented image 205. Visual representations of the proximity information, such as color-coded directional arrows or arrows of different lengths, may also be used to indicate the distance between the object 625 and the vehicle 105. In some instances, the display may include an arrow of variable length that indicates the distance between the object 625 and the vehicle 105. In some instances, the direction of movement of the object 625 is also included in the proximity information.

The process proceeds to step 830, where a vehicle 105 or trailer 110 trajectory is selected. In some instances, the user selects a desired one of any of the optional trajectories presented as part of the path 410 of the vehicle 105 and/or trailer 110. In other instances, the controller 115 selects a trajectory based upon the data obtained by the sensors 140 and images captured by the camera 145. If no selection is made, the process 800 returns to step 805 and obtains new data and images from the sensors 140 and camera 145. Once a selection is made, at step 830, the selected trajectory is included in the augmented image 205 and presented on the display 150 at step 835. The vehicle is then controlled, at step 840, in response to the selected trajectory. In some instances, the driver controls the vehicle. In other instances, the controller 115 controls the vehicle. In instances where the controller 115 controls the vehicle 105, the controller 115 may control the vehicle to drive and/or maneuver along the path 410 incorporating the selected trajectory.

Figure 9:
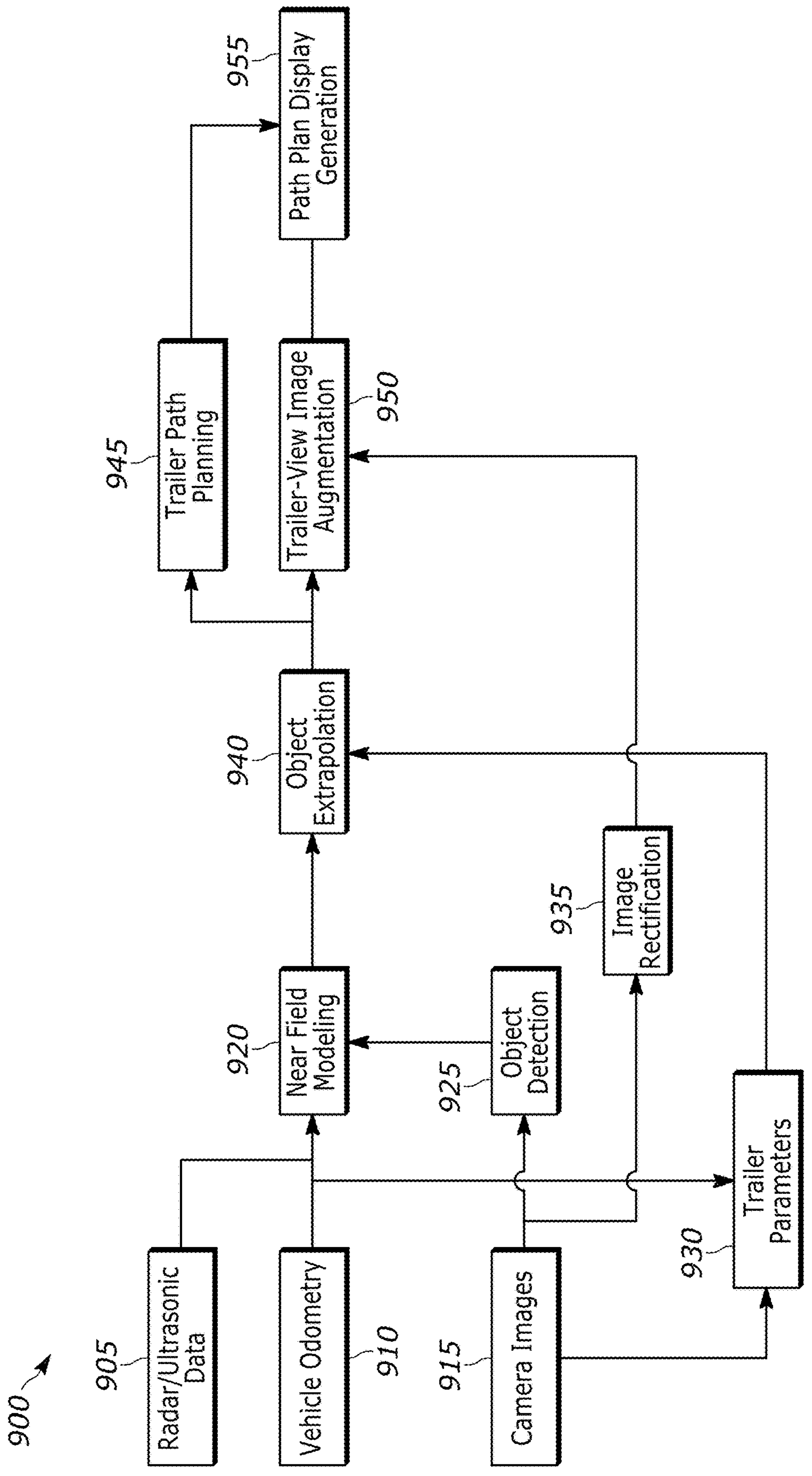
FIG. 9 is a flowchart of a process for generating augmented images, according to some aspects.

FIG. 9 is a flowchart of a process for generating augmented images, according to some aspects. The process includes obtaining (for example, receiving) several system inputs, including obtaining radar and/or ultrasonic data 905, vehicle odometry 910, and camera images 915. The radar and/or ultrasonic data 905 may be provided by sensors on the vehicle 105 or the trailer 110, such as sensors 140. The vehicle odometry 910 may also be provided by sensors 140 on the vehicle 105 and may include wheel rotational measurements or vehicle acceleration provided by an inertial measurement unit. Alternatively, or additionally, vehicle odometry 910 may include externally provided data, such as a position of the vehicle 105 or the trailer 110 provided by a global positioning satellite unit. The camera images 915 are provided by the camera 145 as previously described, and my include images captured of the front, sides, and/or rear of the vehicle 105 or the trailer 110.

A processor, such as the electronic processor 120 of the controller 115, uses the radar/ultrasonic data 905 and the vehicle odometry 910, along with the object detection application 925, to locate objects that are surrounding the vehicle 105 or the trailer 110 and performs near field modeling 920. The near field modeling 920 is used to locate and identify objects, such as the detected object 625, and may recognize and classify such objects based on their shape, size, feature contours, or other characteristics. The near field modeling 920 creates a detailed representation of the nearby environment, allowing for accurate tracking of objects and calculation of the path 410. In instances where trailer parameters are not pre-programed, the vehicle odometry 910 and camera images 915 are also used by a processor to calculate trailer parameters 930. For instance, the electronic processor 120 may use the camera images 915 to determine the size and dimensions of the trailer 110.

The process 900 also includes image rectification 935, where the electronic processor 120 corrects distortions in the camera images 915, such as the Manhattan effect described with respect to FIG. 3B. The image rectification 935 may include determining image parameters, such as a focal length or lens distortion coefficient of the camera 145, or parameters such as camera 145 position and orientation relative to the vehicle 105, to augment images captured by the camera 145. The process 900 also includes object extrapolation 940, where contours determined during the near field modeling 920 are used to extrapolated to physical objects in the environment around the vehicle 105 and trailer 110. Additionally, the object extrapolation 940 may calculate the distance a detected object is from the vehicle 105 or trailer 110, or if the detected object is in motion and has a trajectory. The object extrapolation 940 also uses the trailer parameters 930 to determine the location of the detected objects relative to the location of the trailer 110.

The process 900 includes trailer path planning 945, where the electronic processor 120 uses the object extrapolation 940 as previously described to determine the path 410 to avoid the detected objects. The determination of the path 410 may include any previously defined path determination process, such as those described and illustrated in FIGS. 4-7. The object extrapolation 940 and image rectification 935 are also used by the processor 120 to perform a trailer-view image augmentation 950. The trailer-view image augmentation 950 is the process by which the camera images as previously described are augmented for view by the driver of the vehicle 105. The trailer path planning 945 and the trailer-view image augmentation 950 elements are used by the electronic processor to generate a path plan 955, which is overlayed onto the display 150 to provide the driver with the path 410.

Accordingly, various implementations of the systems and methods described herein provide, among other things, techniques for detecting and monitoring vehicle maneuvers. Other features and advantages of the invention are set forth in the following claims.

In the foregoing specification, specific examples have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

What is claimed is:

1. A control system for a trailer connected to a vehicle, the control system comprising:
- a camera configured to be positioned on the vehicle and to capture images surrounding the vehicle and the trailer;
- a sensor configured to capture sensor data about surroundings of the vehicle and the trailer,
  - a display configured to display images, and
  - an electronic processor configured to:
    - receive the images from the camera,
    - receive the sensor data from the sensor,
    - detect an object using the sensor data and image data,
    - calculate a path of the vehicle relative to the object to generate a plurality of trajectories of the vehicle,
    - identify an image distortion in at least one of the images, the image distortion causing vertical lines to converge inward;
    - perform an image rectification on the at least one image to correct for the image distortion, the image rectification including determining at least one image parameter selected from a group consisting of a focal length of the camera, a lens distortion coefficient of the camera, and a position or orientation of the camera relative to the vehicle;
    - perform a perspective transformation of the corrected image to generate an augmented image, the augmented image including the detected object and the path,
    - present the augmented image on the display,
    - receive a selection of one of the plurality of trajectories, and
    - in response to the selection of one of the plurality of trajectories, control the vehicle.

2. The system of claim 1, wherein the electronic processor is further configured to determine a presence of a blind spot within an area surrounding the vehicle.

3. The system of claim 1, wherein the electronic processor is further configured to receive the selection of a desired parking location and calculate a path of the vehicle relative to the parking location to generate a trajectory of the vehicle.

4. The system of claim 1, wherein the electronic processor is configured to recalculate the path of the vehicle to generate a new trajectory of the vehicle around the object based upon the detection of a second object.

5. The system of claim 1, wherein the plurality of trajectories of the vehicle are dynamically recalculated by the electronic processor when the electronic processor determines a change in vehicle speed, vehicle geospatial location, or vehicle orientation.

6. The system of claim 1, wherein the display includes a touch screen input configured to receive a selection of one of the plurality of trajectories.

7. A method of controlling a trailer connected to a vehicle, the method comprising:
- capturing, via a camera, at least one image of an environment surrounding the vehicle, receiving, via an electronic processor, the at least one image of the environment surrounding the vehicle,
- analyzing, via the electronic processor, the at least one image to determine a presence of an object near the vehicle or the trailer,
- calculating, via the electronic processor, one or more trajectories of the vehicle or the trailer, the one or more trajectories calculated based upon a physical relationship between the vehicle and the connected trailer,
- generating, via the electronic processor, an augmented image based upon the at least one image of the environment surrounding the vehicle and incorporating a superimposed representation of the object and the one or more trajectories within the augmented image,
- performing a perspective transformation, via the electronic processor, of the augmented image,
- presenting, via a display, the augmented image to provide an enhanced view of the environment surrounding the vehicle,
- receiving, via an input interface interacting with the presented augmented image, a selection of one of the one or more trajectories; and
- in response to the selection, controlling the vehicle according to the selected trajectory to navigate both the vehicle and the trailer relative to the object.

8. The method of claim 7, the method further comprising:
- detecting, via a sensor, the object, generating, via the electronic processor, proximity information about the object, and displaying, on the display, the proximity information.

9. The method of claim 8, wherein the proximity information includes one selected from a group consisting of a size of the object, a distance of the object from the vehicle, a distance of the object from the trailer, a speed of the object, and a direction of movement of the object.

10. The method of claim 9, wherein the display is configured to visually represent the proximity information by presenting an arrow of variable length that indicates the distance between the object and the vehicle or trailer.

11. The method of claim 7, wherein the one or more trajectories of the vehicle or the trailer are based upon a detection of the object.

12. The method of claim 7, wherein the one or more trajectories include a forward trajectory and a reverse trajectory.

13. The method of claim 7, wherein the one or more trajectories include a desired parking location for the vehicle or the trailer.

14. The method of claim 7, wherein the one or more trajectories are calculated based upon a real-time hitch angle or a real-time articulation rate between the vehicle and the connected trailer.

15. The method of claim 7, wherein the one or more trajectories are calculated based upon a predicted path of the trailer relative to a tracked path of the vehicle.

16. A method of control for a trailer connected to a vehicle, the method comprising:

capturing, via a camera, at least one image of an environment surrounding the vehicle or trailer, receiving, via an electronic processor, the at least one image of the environment surrounding the vehicle or trailer, identifying, via the electronic processor, an image distortion in the at least one image, the image distortion causing vertical lines to converge inward;

performing, via the electronic processor, an image rectification on the at least one image to correct for the distortion, the image rectification including determining at least one image parameter selected from a group consisting of a focal length of the camera, a lens distortion coefficient of the camera, and a position or orientation of the camera relative to the vehicle;

performing, via the electronic processor, a perspective transformation of the corrected image to generate a top-down view image;

generating, via the electronic processor, an augmented image based upon the corrected image and incorporating a superimposed representation of the vehicle and trailer within the augmented image, performing a perspective transformation, via the electronic processor, of the augmented image, presenting, via a display, the augmented image to provide an enhanced view of the environment surrounding the vehicle or trailer, receiving, via the display, a selection of a desired parking location of the trailer, generating, via the electronic processor, a plurality of trajectories of the trailer based upon the selected desired parking location, the plurality of trajectories calculated based upon a physical relationship between the vehicle and the connected trailer, receiving, via the display, a selection of one of the plurality of trajectories of the trailer, and controlling the vehicle based upon the selected desired parking location and the selected one of the plurality of trajectories of the vehicle.

17. The method of claim 16, the method further comprising:

analyzing, via the electronic processor, the at least one image to determine a presence of an object near the vehicle or the trailer, and recalculating the plurality of trajectories, via the electronic processor, based upon the determination, to avoid the object.

18. The method of claim 17, the method further comprising:

determining, via the electronic processor, a predicted behavior of the object, and recalculating the plurality of trajectories, via the electronic processor, based upon the predicted behavior.

19. The method of claim 16, wherein the plurality of trajectories of the vehicle or trailer are based upon a current speed, an acceleration, a steering angle, or a road/surface curvature of the vehicle or trailer.

* * * * *